(12) United States Patent
Delaney et al.

(10) Patent No.: US 8,799,355 B2
(45) Date of Patent: Aug. 5, 2014

(54) CLIENT SERVER APPLICATION MANAGER

(75) Inventors: Aidan Delaney, Seattle, WA (US);
Joseph W. Hallock, Renton, WA (US);
Cesare John Saretto, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 12/611,236

(22) Filed: Nov. 3, 2009

(65) Prior Publication Data
US 2011/0106876 A1  May 5, 2011

(51) Int. Cl.
*G06F 15/16*  (2006.01)

(52) U.S. Cl.
USPC ............................................. 709/203; 726/26

(58) Field of Classification Search
USPC ............................................. 709/203; 726/26
See application file for complete search history.

(56) References Cited

U.S. PATENT DOCUMENTS

| | | | |
|---|---|---|---|
| 6,029,246 A | | 2/2000 | Bahr |
| 6,362,836 B1 * | | 3/2002 | Shaw et al. .................. 715/744 |
| 6,678,750 B2 * | | 1/2004 | Meade et al. ....................... 710/7 |
| 6,789,111 B1 * | | 9/2004 | Brockway et al. ............ 709/222 |
| 7,363,359 B1 | | 4/2008 | Tripathy et al. |
| 7,398,195 B2 * | | 7/2008 | Flavin ............................ 703/27 |
| 7,483,961 B2 * | | 1/2009 | Affaki ........................... 709/219 |
| 7,571,454 B2 | | 8/2009 | Potrebic et al. |
| 7,584,225 B2 | | 9/2009 | Jiang et al. |
| 2004/0122832 A1 | | 6/2004 | Heil |
| 2006/0107327 A1 * | | 5/2006 | Sprigg et al. .................... 726/26 |
| 2007/0038681 A1 | | 2/2007 | Pierce et al. |

FOREIGN PATENT DOCUMENTS

WO  WO03081444 A1  10/2003

OTHER PUBLICATIONS

"Notification Services Enhancements—SQL Server", retrieved at <<http://msdn.microsoft.com/en-us/library/ms170722  (SQL.90). aspx, Nov. 2008, pp. 3.
"SI3000 NotiS—Notification Server", retrieved at << http://www.iskratel.com/en/applications/products/notification_server/defaultaspx, Sep. 18, 2009, pp. 2.

* cited by examiner

*Primary Examiner* — Thomas Dailey
(74) *Attorney, Agent, or Firm* — Henry Gabryjelski; Kate Drakos; Micky Minhas

(57) ABSTRACT

A client/server distribution system for applications, media, messages, and other items operates by distributing a list of items to client devices, then the client devices may generate a user interface that reflects the availability of the items based on the capabilities of the device and permissions of the user. The distribution system may distribute media for consumption on the clients, applications that may be executed on the server, messages for status and other purposes. Each item may have an associated application that may be launched from the user interface, and the client devices may customize the launch script or other configuration based on the characteristics of the client device and permissions of the user.

20 Claims, 4 Drawing Sheets

CLIENT SERVER APPLICATION MANAGER

BACKGROUND

Applications and services are often shared by a server computer to client computers. The applications may be applications that operate on the server computer and are accessed on the client computer. One service that is often shared is file sharing, where a server computer may store files that are accessed or consumed on a client device. The files may include media files, such as video, audio, and image files as well as text files, word processing files, spreadsheet files, and other type of files.

In many client/server environments, notifications or messages may be transmitted from the server to the client. The notifications may include status messages, notifications of changes within the environment, and other messages.

SUMMARY

A client/server distribution system for applications, media, messages, and other items operates by distributing a list of items to client devices, then the client devices may generate a user interface that reflects the availability of the items based on the capabilities of the device and permissions of the user. The distribution system may distribute media for consumption on the clients, applications that may be executed on the server, messages for status and other purposes. Each item may have an associated application that may be launched from the user interface, and the client devices may customize the launch script or other configuration based on the characteristics of the client device and permissions of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
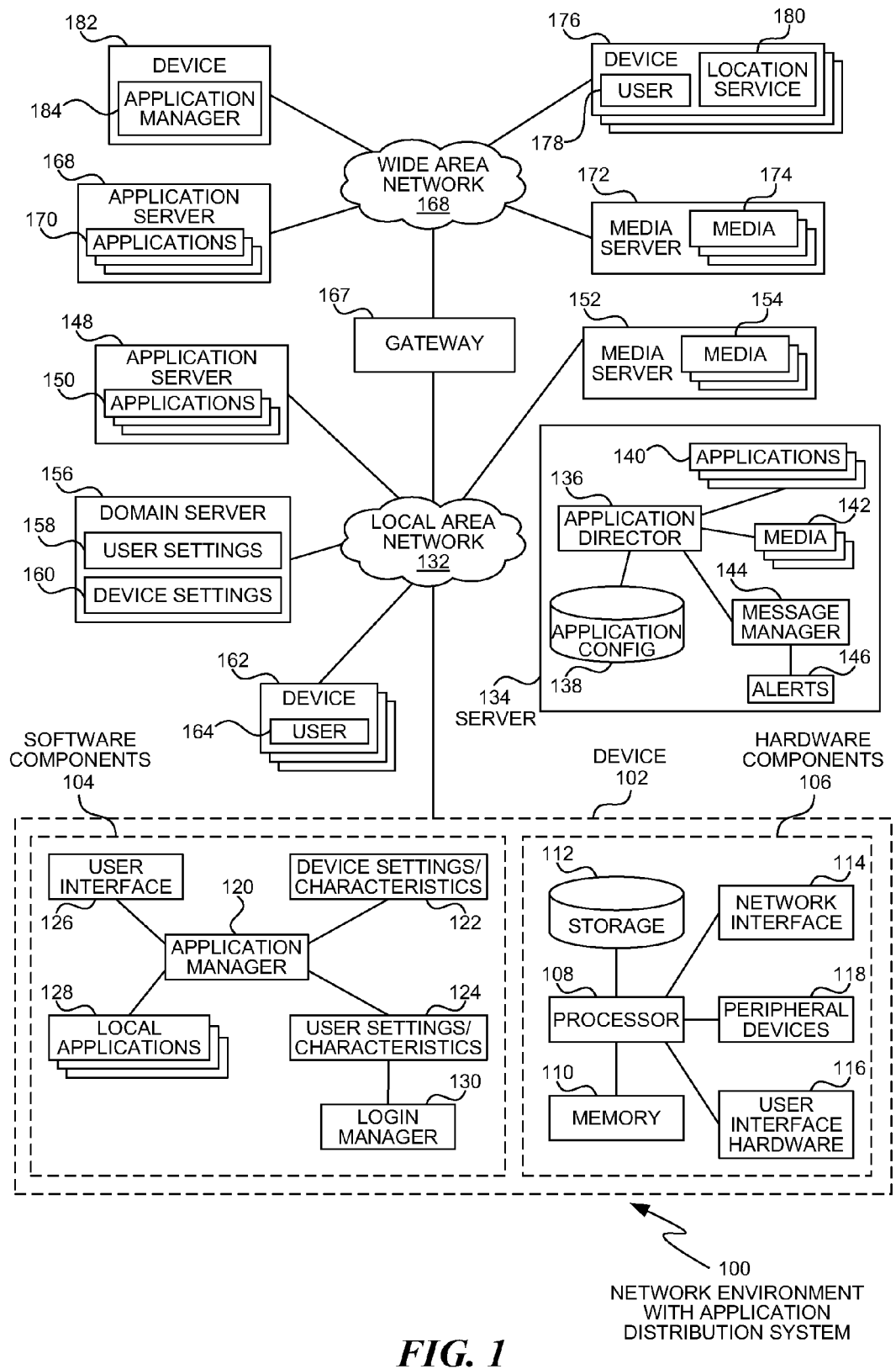
FIG. 1 is a diagram illustration of an embodiment showing a network environment in which an application manager may operate.

A distribution system for applications, media, and messages distributes a set of descriptors and other information to client devices. The client devices may determine which of the applications, media, and messages are appropriate or capable of being shown or executed on the client device based on the device's capabilities, the user's permissions, and other factors. A user interface may be created that is tailored to the user and device configuration, and configuration settings may be created or modified so that an application may be launched appropriately for the situations.

The distribution system may allow access to applications, media, and messages that are provided by a server within a local area network, as well as applications and media that may be available from other servers, both local and remote.

The distribution system may be used to distribute applications and content to users and devices within a network, and may serve as a simple, efficient mechanism to centrally manage applications and content. The distribution system may be applicable to small network, such as a home or small business, as well as other, larger networks that may be used in an enterprise.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied (embedded?) in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which a client/server application distribution system may operate. Embodiment 100 is a simplified example of a network environment in which a server may provide application information to a client, and the client may customize a user interface based on the configuration and situation of the client.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

The client/server distribution of embodiment 100 is a mechanism to provide applications, services, media, messages, and other items to client devices. A server may create a set of descriptors for applications, media, and other items, and may transmit the descriptors to the client device. The client device may configure a user interface with descriptors for the items based on the capabilities and configuration of the device, along with the permissions of the user.

The distribution system may be a mechanism by which an administrator may make applications available to users of different computers across the network. In many embodiments, the distribution system may be easy to configure and update, and may provide a simple, easy to understand user interface on a client device that gives access to media and applications across the network.

The device 102 may be a typical computing device, such as a laptop or desktop computer. The device 102 may have software components 104 and hardware components 106.

The device 102 may be any type of device capable of operating on a network and having a user interface. The device 102 may be a desktop or laptop computer, server computer, netbook computer, portable scanner, personal digital assistant, cellular telephone, media player, game console, or any other device capable of performing the functions described for the device 102.

The software components 104 and hardware components 106 are illustrated as an example architecture that may be typical of a personal computer. Other devices may have different hardware and software architectures and may perform the functions described.

The hardware components 106 may include a processor 108 that may use random access memory 110 and may have a nonvolatile storage 112. The hardware components 106 may also include network interface hardware 114 and user interface hardware 116. The user interface hardware 116 may include a display along with an input device, such as a keyboard or pointing device. In some embodiments, the user interface hardware 116 may include several output and input devices, and may include keyboards, pointing devices, touchscreens, or other detection devices that may provide input.

The hardware components 106 may include various peripheral devices 118. The peripheral devices 118 may be different devices that may be attached to the device 102 and may be controlled by the processor 108. Examples may include external storage devices, card readers, cameras, controllers for lighting, instrumentation for gathering data, output devices such as printers or plotters, and many other devices.

The peripheral devices 118 may be sensed when applications, messages, and other items are being prepared to be displayed. The presence of a specific peripheral device may be used to customize an application configuration so that the peripheral may be used by the application, for example. In another example, an application that uses a specific type of peripheral may be presented to a user only when that peripheral is present on the device.

The software components 104 may include an application manager 120 that may gather various data, including a set of descriptors for various items, and may prepare a user interface that includes those items. The set of descriptors may include descriptors for applications, media, as well as messages that may be displayed to a user.

When the descriptors are analyzed by the client device 102, the client device 102 may determine which items are permissible to be displayed, and may configure applications to operate with the local characteristics.

The application manager 120 may use device settings and characteristics 122 and user settings and characteristics 124 to identify those items that are capable of being executed or consumed by the device 102, and for which the user of device 102 may have permissions.

The device settings and characteristics 122 may include any setting, capability, feature, or other item that may be used to change how an application operates, how media is consumed, or any other functional item.

In many embodiments, the device settings may include hardware configuration information, which may include the performance characteristics of the hardware. These may include processor speed, memory, and storage capabilities that may be used to identify which types of applications may be capable of being executed on the device. The hardware configuration information may also include characteristics about input and output devices, such as which input devices are available and the characteristics of any output device.

The hardware configuration information may be used to identify which applications may be executed on the device 102 as well as modifying any configuration that the application may have so that the application executes properly on the device 102.

For example, a device with a touchscreen input may have the layout of an application modified for use by a touchscreen. Such a modification may present icons on the touchscreen at a proper size and spacing for easy use with a user's finger, as well as having certain features enabled for touch. The same application may be used on another device with a conventional pointing device, but may have icons spaced differently and in different configurations for a mouse or other conventional pointing device.

In another example, a device that has audio output capabilities may be configured to consume audio or video media, while a similar device without audio output capabilities may not make the same media available to a user.

The hardware configuration information may be used to configure an application to operate properly on the device 102. For example, an address of a peripheral device may be added to an application launch script so that the application will use the peripheral device when launched. In another example, the size of a display may be added to a configuration file so that an application may conform its output to match the display size.

The device settings may also include software capabilities of the device 102. The software capabilities may include information about an operating system on the device 102, as well as various applications that may be already installed. In some embodiments, the software capabilities may identify a particular application that is capable of performing a specific task. For example, a device may be configured with several different web browsers, but one of the web browsers may be the primary application for displaying web pages. When an application is customized for the device 102, the primary web browser may be identified to be called by the application in a launch script, customization file, configuration file, or other mechanism.

In another example, the software applications on a device 102 may be searched to identify applications for a particular function, such as audio playback or video playback. An installed application that performs the function may be identified and used in a configuration file to consume a media file made available by an application manager 120.

User settings and configuration 124 may be used by an application manager 120 to identify those applications, media, messages, and other elements that a specific user is permitted to use or consume. A current user may be a network administrator and may be permitted to see network configuration and status messages, but another use may not have administrative privileges and may be shown a different set of messages, for example.

The user settings and configuration 124 may include settings that are determined by a domain server 156. The domain server 156 may provide authentication and configuration services to various users and devices across a local area network 132. In many cases, a domain server 156 may operate a version of a Lightweight Directory Access Protocol (LDAP) or other technology for authenticating users, distributing configuration information, and other directory services. In many such embodiments, a domain server 156 may have a directory of user settings 158 and device settings 160 that may define how a user or device, respectively, are to be configured and which permissions or capabilities the user and device may have.

In many domain servers 156, a set of policies may be applied to certain groups of users or devices. For example, a user that is a member of a network administrators group may have certain privileges for accessing network configuration settings and performing certain functions that a normal user may not have. In another example, a device may be configured to have access to certain services from a server device in the local area network 132, while other devices may be configured to not have access or to have access from a similar service across a wide area network 168 such as the Internet.

Some of the configuration information for both the device settings and characteristics 122 and user settings and characteristics 124 may be obtained through a query to a domain server 156 or other network management device. Other configuration information may be gathered by searching any local settings, configurations, or databases on the device 102.

The application manager 120 may receive a list of available applications, services, media, messages, and other items and may create a user interface 126 that is customized or tailored for the situation of the device 102. The device capabilities, user permissions, and other factors may be used to display a list of available items from which a user may select and launch the item.

The list of available applications may be a file, message, or other descriptor. In some embodiments, an XML format may be used to describe all of the available applications, media, messages and other information that may be used by the application manager 120.

In some cases, a user interface 126 may include indicators for items that are unavailable to the user or device. These items may be disabled but still displayed. In many cases, the displayed items may be greyed out or otherwise displayed as unavailable. Some embodiments may, for example, display an icon or test that indicates the item is unavailable. In some embodiments, a greyed out or unavailable displayed item may have an explanation for the unavailability. For example, hovering a pointer over the unavailable item may display a message indicating that the user does not have permission or the device is incapable of performing a specific action.

In some cases, the user interface 126 may not display certain unavailable items. For example, an application that may be incapable of being operated on a device or for which the user does not have access may be eliminated from the user interface 126.

An example of a user interface is illustrated in embodiment 400 presented later in this specification.

The application manager 120 may include references to one or more local applications 128 that may be called from the user interface 126. The local applications 128 may operate independently from or in conjunction with other applications that may be provided by a local or remote server.

In one use scenario, the application manager 120 may receive references to several media files, and the user interface 126 may be configured to display references to the media files. When a media file is selected by a user, a local application 128 may be launched to consume the media file and display the media to a user.

In another use scenario, the application manager 120 may receive a reference to a backup application, and may configure the user interface 126 to launch a backup application when selected. The backup application may have a local application 128 that operates in conjunction with a remote backup service on an application server within the local area network 132 or wide area network 168.

In still another use scenario, the application manager 120 may receive a reference to an application that may be downloaded and installed on the device 102. The user may click on the user interface 126 that references the application, then the application may be downloaded, installed, and configured to operate as a local application 128. Such an application may be launched using the user interface 126 or may be launched using other mechanisms, such as a start menu, command line, or other mechanism.

A server 134 may provide the application manager 120 with a list of applications, media, messages, and other items. The server 134 may have an application director 136 that may manage those items sent to a device. In one function, the application director 136 may receive a new application 140 or media 142 to distribute and may add a descriptor for the application or media in an application configuration 138. The application configuration 138 may contain the list of applications, media, messages, and other items that may be transmitted to and processed by an application manager 120.

In some embodiments, the server 134 may provide messages to the device 102 for processing and potential display on the user interface 126. The messages may be status messages, alerts, or other information that may be updated in real time in some embodiments. A massage manager 144 may have an alert system 146 and may generate the messages that may be displayed on the user interface 126.

Some embodiments may use various location services or proximity to other devices or users to modify the applications, media, messages, and other items displayed on the user interface 126. In such embodiments, the application manager 120 may identify various devices 162 that may or may not have users 164 associated with the devices 162.

The proximity to other devices may allow an application manager 120 to customize certain aspects of an application or function. For example, one application or function may be to install a printer driver. The application manger 120 may detect one or more printer devices 162 that are physically near the device 102 and may provide customized installation scripts for those printers. The application manager 120 may omit printers that are far away from the device 102, or may make those printers optional, for example.

The proximity to other users may allow an application manager 120 to customize applications to communicate, notify, or help another user. For example, an administrator user may receive alert messages from devices 162 for nearby users 164 that are experiencing errors or attempting to perform an action that uses administrator privileges. The messages for such alerts may be, for example, sorted by the closest user or modified with the user's physical location.

In some embodiments, a location service or proximity may also be used to locate remote devices 176 and users 178 that may be available over a wide area network 168 such as the Internet. In some cases, the remote devices 176 may have onboard location services 180 that may determine a physical location for the remote device 176. One example of such a location service 180 may be an embedded Global Positioning System (GPS) receiver.

A small network may have a single server 134 that may manage the list of applications and other items as well as provide all of the applications 140, media 142, and messages to client devices, such as device 102. Larger networks may have distributed servers, and other local application servers 148 may serve applications 150, as well as media servers 152 that serve various media 154. The identifiers and configuration information for the other applications 150 and media 154 may be managed by the application director 136 and stored in the application configuration 138.

In some cases, remote application servers 168 may provide applications 170 through a wide area network 168 that may be accessed through a gateway 167. Additionally, remote media servers 172 may provide media 174 over the wide area network 168. The remote applications 170 and media 174 may be managed by the application director 136 and added to the application configuration 138.

Remotely accessed applications 170 and media 174 may be accessed as part of a subscription or service for which credentials are used to access the applications 170 or media 174. In such embodiments, the application director 136 may be capable of establishing the credentials and adding those credentials into the application configuration 138. When an application manager received the application configuration 138, the credentials may be included and used by a device to access the remote applications 170 or media 174.

Many different devices may have an application manager and may receive the application configuration 138, create an appropriate user interface, and access various items through the user interface. In each device, the user interface may be configured based on many different factors, including device capabilities, user permissions, and location information.

The remote device 182 may also have an application manager 184 that may allow the device 182 to access various applications, media, messages, and other items through the application configuration 138. The remote device 182 may connect to the server 134 through the gateway 167 from a wide area network 168, such as the Internet. In some cases, the remote device 182 may connect using a Virtual Private Network (VPN) or other secure mechanism to authenticate and communicate with the local area network 132.

The remote device 182 may be a laptop computer, for example. Because of the location services or proximity information, the laptop computer may present a different user interface when the laptop is connected directly to the local area network 132 as compared to when the laptop is connected through the wide area network 168. In some cases, certain services or capabilities may be made available only when connected to the local area network but not when the device 182 is connected to the wide area network 168.

Figure 2:
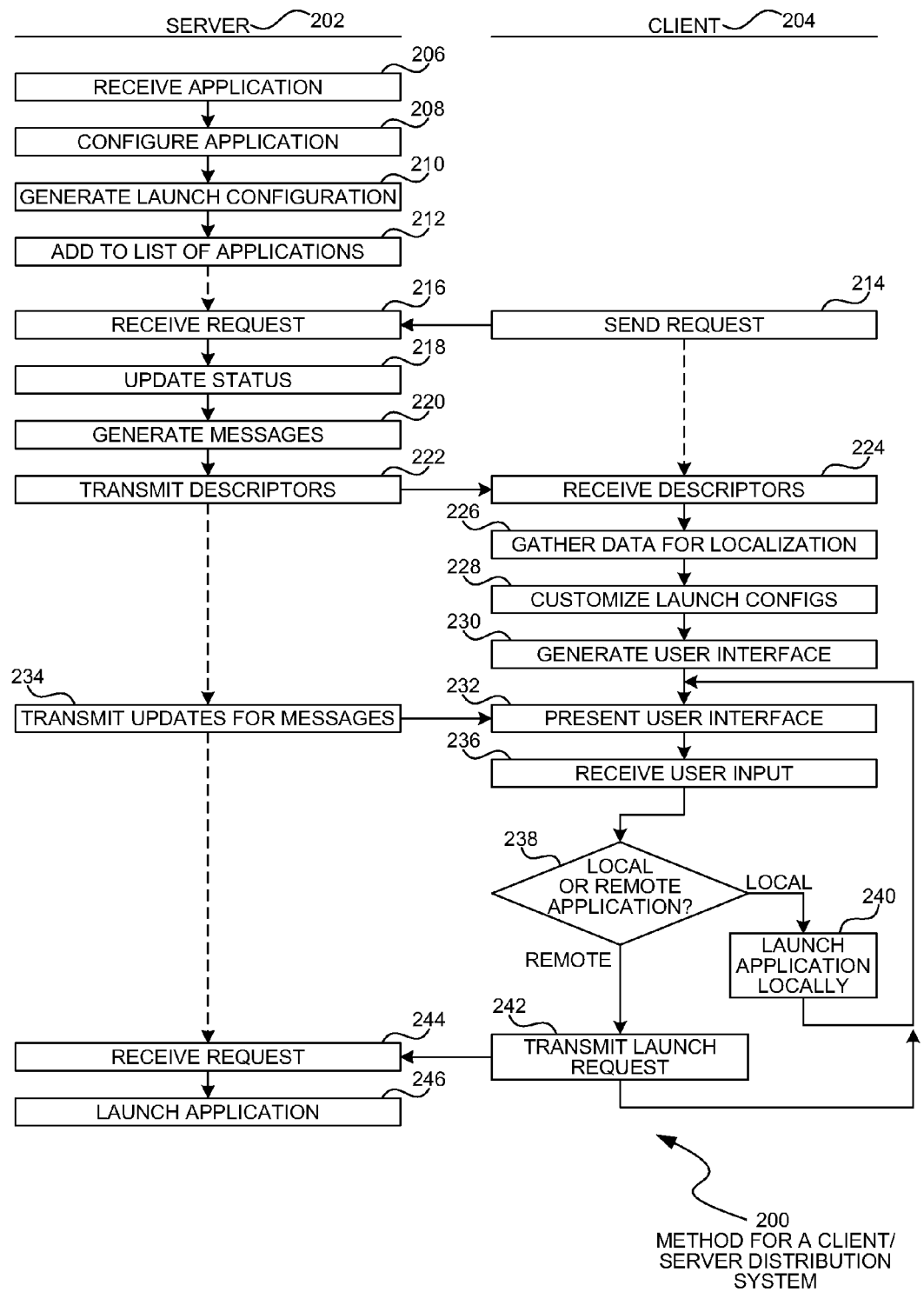
FIG. 2 is a timeline illustration of an embodiment showing a method of a client/server distribution system with the interactions between the client and server.

FIG. 2 is a timeline illustration of an embodiment 200 showing a method for a client/server distribution system for applications, media, and other items. Embodiment 200 is an example of the processes that may be performed by the server 134 and application manger 120 on device 102 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates some of the interactions that may occur between a server 202 and client 204 to provide applications, media, messages, and other items to a user, then allow those items to be executed or consumed by the user.

The operations of the server 202 are presented in the left hand column and the operations of the client 204 are presented in the right hand column Embodiment 200 is merely one simplified example of some of the operations that may be performed by the server 202 and client 204 and merely one simplified example of the handshaking or interaction between the two devices.

In block 206, the server 202 may receive an application. The application may be configured in block 208 and a launch configuration may be generated in block 210 and added to a list of applications in block 212.

The operations of blocks 206 through 212 create a new entry on a list of applications, and configure the application for distribution through the client/server distribution mechanism.

An application may be configured to be distributed in several different manners. In one distribution mechanism, an application may be provided by a remote server and accessed by a client device. In some cases, such applications may be accessed using a general purpose application such as a web browser. In such an embodiment, the application may be configured by creating a link to a website through which the application may be accessed. The link may include various parameters, credentials, or other information so that a user may access the application, for example. Other remote applications may be accessed using various remote technologies where the remote application is capable of displaying a window on a client device through which a user may interact with the application.

In another distribution mechanism, an application may be configured to be downloaded and installed on a local device. In such a mechanism, the application may be packaged using an installer application so that the client device may automatically download and install the application.

During the configuration in block 208, various options for the application may be configured. In some cases, the options may be defined or set in block 208. For example, an administrator may configure a specific application to operate using a restricted set of parameters. In other cases, the options may be identified for setting by a client device. For example, an application may be configured to use a parameter determined by a local device for a proper printer configuration for an application.

The list of applications may include descriptors for the applications. The descriptors may include functional descriptors and display descriptors. Functional descriptors may include parameters used to launch an application as well as parameters that may describe situations in which the application may be used. Parameters used to launch an application may include Uniform Resource Locator (URL) for a remote application and credentials used to access a remote application, among others.

Some parameters may describe situations in which an application may be used. Such parameters may describe devices on which an application may operate, or may describe devices on which the application may not operate. The parameters may include minimum or maximum values of various hardware or software items that may enable or prohibit the application operation. These parameters may be used by the client 204 to determine if and how the application may be executed, and whether or not to present the application to a user in a user interface.

The display descriptors may include items that may be displayed in a user interface. These may include text labels, prompts, and other information that may be displayed, including icons, images, and other graphical elements including fonts, colors, and presentation information. The display descriptors may also include grouping information that may categorize the applications by group. In some embodiments, applications in the same group may be presented together.

In block 214, a client 204 may send a request for the list of applications, and the server 202 in block 216 may receive the request.

In some embodiments, the request from the client 204 may be a generic request that merely requests the list of applications. In other embodiments, the request may include some additional information. For example, the request may include authentication credentials that may be used by the server 202 to determine if the client request is authentic and if the client request is permitted.

In some embodiments, the request of block 214 may include parameters about the user and device of the client 204. Such parameters may be used by the server 202 to determine an appropriate subset of the list of items to send to the client 204.

After receiving the request in block 216, the server 202 may update status in block 218 and generate messages in block 220. The status operation of block 218 may perform various queries to determine messages that may be presented in the client user interface. The status of block 218 and messages of block 220 may be performed after the request of block 216 so that the messages are up to date.

In some embodiments, the messaging mechanisms may continually monitor certain conditions and generate alerts or messages when those conditions exist. Such a messaging mechanism may be used to monitor the 'health' or proper operation of a particular device or network of devices.

The messages of block 220 may be added to the list of items to generate descriptors that are transmitted in block 222 by the server 202 and received by the client 204 in block 224.

After receiving the descriptors in block 224, localization information may be gathered in block 226 and the launch configurations may be customized in block 228. A user interface may be generated in block 230.

Embodiment 300 presented later in this specification may present a detailed method that may be performed for blocks 224-232.

After generating the user interface in block 230, the user interface may be presented to a user in block 232. During the period while the user interface is displayed, the server 202 may transmit updates for messages in block 234.

The updated messages in block 234 may be transmitted from the server 202 to the client 204 by any mechanism. In some cases, the update messages may be pushed to the client 204 by the server 202 when a status changes and a new message is created. In some embodiments, the client 204 may request or poll the server 202 to retrieve a current status.

User input may be received in block 236. If the selected application is a local application in block 238, the local application may be launched in block 240. If the application is a remote application in block 238, the lunch request may be transmitted to a server in block 242, and the server 202 may receive the request in block 244 and launch the application in block 246.

The various items displayed in the user interface may have various mechanisms for receiving input. In a graphical user interface, a user may select an item using a pointing device, and may cause an application to launch by double clicking or other interaction with the device.

Each of the items in the user interface may have an associated application that may be executed when the item is selected. In the case of media that may be displayed in the user interface, an appropriate media player application may be launched when the item is selected. In the case of a message, some messages may have associated applications that may enable a user to drill down into the source of a message, respond to a message, or perform some other action.

Figure 3:
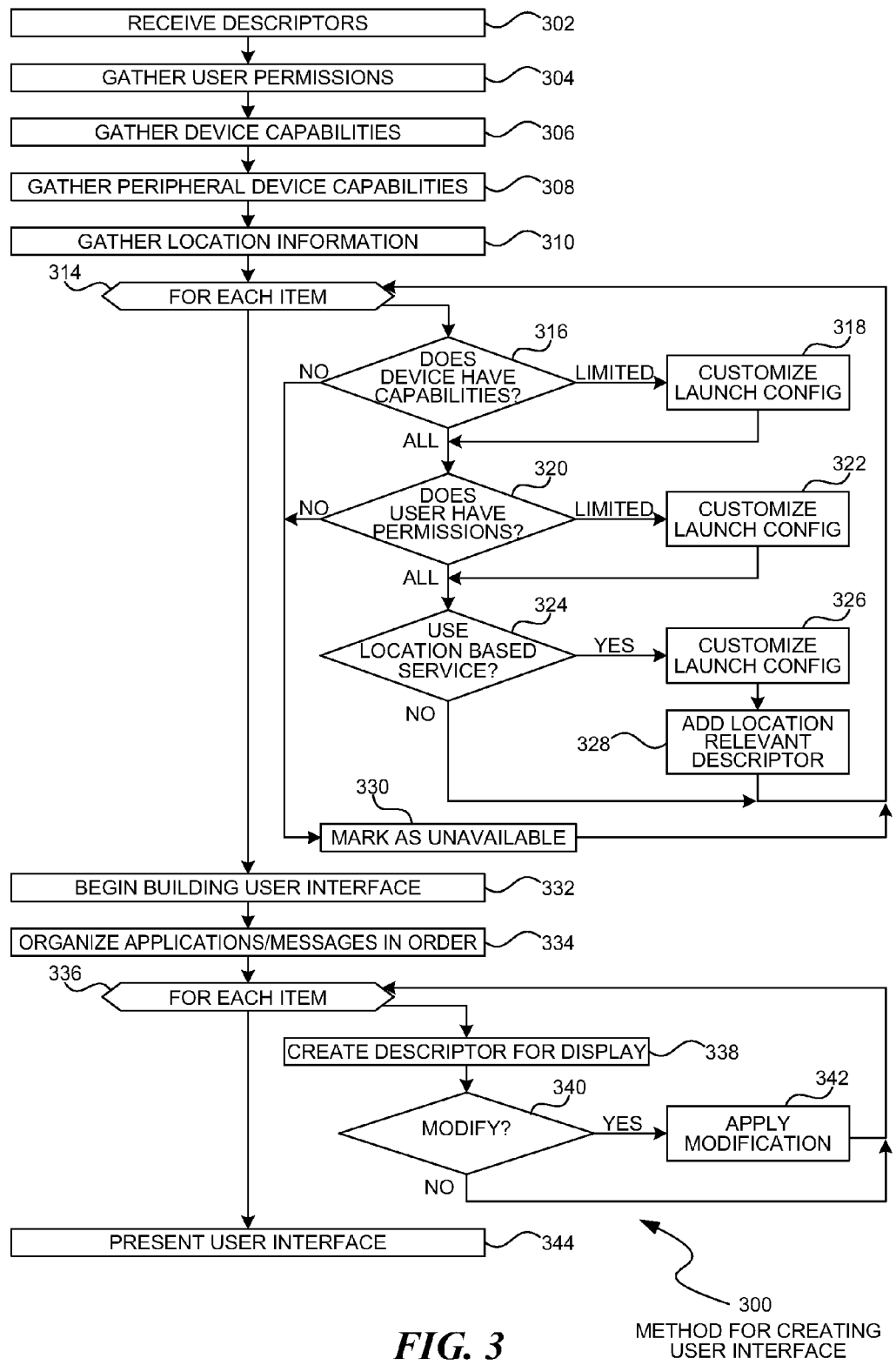
FIG. 3 is a flowchart illustration of an embodiment showing a method for creating a user interface.

FIG. 3 is a flowchart illustration of an embodiment 300 showing a method for creating a user interface from a set of descriptors. Embodiment 300 may illustrate one example of a method that may be performed by the blocks 224-232 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The method of embodiment 300 may illustrate a more detailed method of analyzing descriptors and creating a user interface from those descriptors. The descriptors may include various parameters about applications, media, messages, and other items. A client device may analyze the descriptors to find the appropriate applications for the device and user configuration, then customize the applications for the configuration. A user interface may be constructed that presents the applications to a user.

In block 302, a set of descriptors may be received. The set of descriptors may be a list of applications, media, messages, or other items that may be associated with applications.

User permissions may be gathered in block 304. The user permissions may include the privileges that a current user of a client device may have. The user permissions may be used to determine which applications, media, messages, or other items may be shown the user or made available to the user. In many embodiments, certain users may have some permissions that other users may not have. For example, an administrator may be permitted to access applications that make configuration changes to a device or network, while general users may not.

The user permissions of block 304 may be gathered by a local login manager on a client device. Some embodiments may perform a query to a domain server or some other device to gather user permissions and may gather user profiles in some instances.

Device capabilities may be gathered in block 306. The device capabilities may include hardware and software components and their settings, configurations, and capabilities. Similarly, peripheral device capabilities may be gathered in block 308.

Location information may be gathered in block 310. Location information may include the physical location of a device, as well as a network location. The network location may identify a connection to a network, along with a location that may be used to identify other devices or users nearby.

In block 314, each item may be processed. The items in block 314 may be applications, media, messages, or other items found in the descriptors of block 302.

If the device does not have the capabilities to execute an application associated with the item in block 316, the item may be marked as unavailable in block 330.

If the device has limited capabilities to execute an application associated with the item in block 316, a launch configuration for the application may be customized in block 318. The customization of block 318 may include settings or parameters that limit the application's capabilities or matches the application's functions to those of the device. If the device has full capabilities to execute the application in block 316, the process may continue to block 320.

If the user does not have permissions in block 320 to execute an associated application or does not have permissions to access the item, the item may be marked as unavailable in block 330.

If the user has limited permissions to access the item in block 320, the launch configuration of the item may be customized in block 322. If the user has full capabilities to access the item in block 320, the process may continue to block 324.

If the item references location based services in block 324, the launch configuration may be modified in block 326 and a location relevant descriptor may be added in block 328.

The launch configuration that may be customized in blocks 318, 322, and 326 may be any mechanism by which an application may be customized. In some embodiments, a customized script may be created or modified to cause an application to be launched. The customized script may include parameters passed to the application as well as causing other applications or services to be performed. In some such scripts, several applications or services may be executed to perform a task.

In some embodiments, the customization may be modifying a configuration file used by an application. The configuration file may be passed to the application or otherwise consumed by the application and may include parameters used by the application or other customizations.

In some embodiments, an application may be launched using a Uniform Resource Locator (URL). In such embodiments, the customization may be parameters that are modified or configured within the URL call to the application.

In block 332, the user interface may begin construction. In block 334, the items may be organized in order of display. In many embodiments, various items may be grouped together for display as groups and subgroups. Groups of items may be displayed in various manners. In one example, a group may be displayed with a heading and members of the group gathered beneath the heading. In another example, a submenu, tab, or other graphical element may be used to show the grouped elements together. In one such an example, several groups may be displayed by the group name and a user may click on the group name to view the members of the group.

Each item may be processed in block 336. In block 338, a visual descriptor for the item may be created. In many cases, a visual descriptor may be defined in the descriptors of block 302, but in some cases, the visual descriptor of block 338 may be a modification or replacement of the visual descriptors of block 302. If the descriptor is to be modified in block 340, a modification may be applied in block 342. The modification may be an icon, highlighting, or other visual modification that may be applied. In the case of an item that may not be available, the modification of block 342 may be greying-out the item or applying an icon that indicates the item is not available.

Once the items are processed in block 336, the user interface may be presented to a user in block 344.

Figure 4:
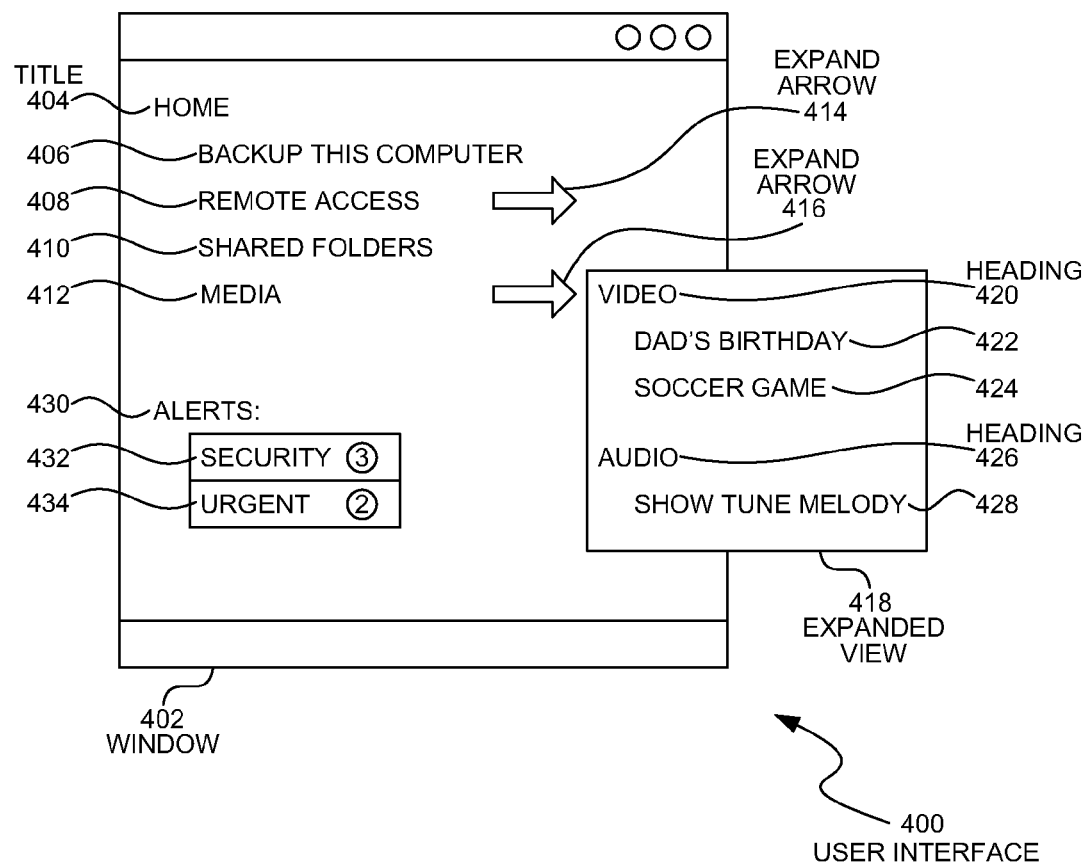
FIG. 4 is a diagram illustration of an embodiment showing an example user interface.

FIG. 4 is a diagram illustration of an embodiment 400 showing an example user interface. Embodiment 400 is a simplified example of a user interface that may be created by the process of embodiment 300, among others.

The window 402 may be a window within a graphical user interface. The user interface includes a title 404, as well as several items 406, 408, 410, and 412. Item 406 may launch a backup operation for the local computer. Items 408 and 412 may have expand arrows 414 and 416 that, if clicked, may open an expanded view, such as expanded view 418.

Item 408 may launch a remote access application that may be configured or customized to access devices that may be selected after clicking on the expand arrow 414. Item 410 may access shared folders on a server device, and may launch a file browser application. Item 412 may access various media, as displayed in the expanded view 418.

Expanded view 418 may illustrate two headings 420 and 426, as well as items 422, 424, and 428 within the headings. The items 422, 424, and 428 may be media files that may be available from various media sources and launched with a media player application. The media sources may be local media, media stored on a server within a local area network, as well as media delivered from remote servers.

The alerts box 430 may illustrate various messages that may be displayed within the user interface of embodiment 400. The alerts 432 and 434 are illustrated in summary form. Alert 432 may be a security alert for which three instances may exist. Similarly, alert 434 may be urgent messages for which two instances may exist. A user may access the actual alerts or launch corrective applications or other functions by selecting the desired alert type.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A client method performed by a client device, said client method comprising:
  receiving a list of applications from a server, said list comprising a set of descriptors for each of said applications, said set of descriptors comprising access parameters, said list of applications comprising at least one application that at least one user of the client device is not authorized to access;
  determining a first current user for said client device;
  determining, on the client device, a set of permissions for said current user;
  determining a set of device characteristics for said client device;
  generating a first user interface comprising references to at least some of said applications by a method comprising:
    for each of said applications, determining, on the client device, access privileges for said first current user based on said set of permissions, and determining access characteristics based on said set of device characteristics;
    generating said user interface comprising a subset of said applications where said applications are permitted to be accessed by said current user based on said access privileges and capable of being accessed on said client device based on said access characteristics;
  presenting said first user interface on a display;
  receiving a selection of a first application from said user interface; and
  causing said first application to be executed.

2. The client method of claim 1 further comprising:
  configuring at least one of said applications based on said device characteristics.

3. The client method of claim 2, said device characteristics comprising the presence of a peripheral device on said client device.

4. The client method of claim 2, said device characteristics comprising the physical proximity to a second device attached to said client device.

5. The client method of claim 2, said device characteristics comprising a network access configuration.

6. The client method of claim 5, said network access configuration comprising one of a group composed of a remote connection and a local area network connection.

7. The client method of claim 1, said set of permissions being determined by accessing a directory service to retrieve said set of permissions.

8. The client method of claim 7, said set of permissions being determined by at least one group membership of said current user.

9. The client method of claim 1 said user interface comprising a configuration for said first application, said configuration being used to execute said first application.

10. The client method of claim 1, said user interface comprising an indicator for a second application for which access characteristics do not permit said second application to be executed, said indicator indicating that said second application cannot be executed.

11. The client method of claim 10, said indicator comprising greying out said indicator for said second application.

12. The client method of claim 1, said list of applications being defined in XML.

13. A computer readable storage medium not comprising propagated waves comprising computer executable instructions configured to perform the client method of claim 1.

14. A client device comprising:
  a processor configured to execute applications;
  a hardware network connection;
  a user interface device;
  a login mechanism comprising user profiles and configured to use a user profile for each user of said client device;
  an application manager configured to:
    receive a list of applications from a server, said list comprising a set of descriptors for each of said applications, said set of descriptors comprising access parameters, said list of applications comprising at least one application that at least one user of the client device is not authorized to access;
    determine a first current user for said client device;
    determine a set of permissions for said current user;
    determine a set of device characteristics for said client device;
    generate a first user interface comprising references to at least some of said applications by a method comprising:
      for each of said applications, determining access privileges for said first current user based on said set of permissions, and determining access characteristics based on said set of device characteristics, and
      generating said user interface comprising a subset of said applications where said applications are permitted to be accessed by said current user based on said access privileges and capable of being accessed on said client device based on said access characteristics;
    present said first user interface on a display;
    receive a selection of a first application from said user interface; and
    cause said first application to be executed.

15. The client device of claim 14, said first application being executed at least in part on said server.

16. The client device of claim 14, said first application being executed at least in part on said client device.

17. The client device of claim 14, said first application having an indicator comprising a first media file to be consumed by said first application.

18. The client device of claim 17, said first application having a plurality of said descriptors, each of said descriptors comprising at least one media file consumed by said first application.

19. A client method performed by a client device, said client method comprising:
  receiving a list of applications from a server, said list comprising a set of descriptors for each of said applications, said set of descriptors comprising access parameters, said list of applications comprising at least one application that at least one user of the client device is not authorized to access;
  determining a first current user for said client device;
  determining, on the client device, a set of permissions for said current user;
  determining a set of device characteristics for said client device, said device characteristics comprising an indicator when said client device is connected to a local area network on which said server is connected;
  receiving a list of status messages from said server;
  generating a first user interface comprising references to at least some of said applications by a method comprising:
    for each of said applications, determining access privileges for said first current user based on said set of permissions, and determining access characteristics based on said set of device characteristics;

for at least one of said applications, creating a configuration for executing said at least one of said applications based on said access characteristics;

generating said user interface comprising a subset of said applications where said applications are permitted to be accessed by said current user based on said access privileges and capable of being accessed on said client device based on said access characteristics, and at least one of said messages;

presenting said first user interface on a display;

receiving a selection of a first application from said user interface; and causing said first application to be executed.

20. The client method of claim 19, said first application being executed using a first configuration.

* * * * *